US008974761B2

(12) United States Patent
Gupta et al.

(10) Patent No.: US 8,974,761 B2
(45) Date of Patent: *Mar. 10, 2015

(54) METHODS FOR PRODUCING SILANE

(71) Applicant: SunEdison, Inc., St. Peters, MO (US)

(72) Inventors: Puneet Gupta, Houston, TX (US);
Henry F. Erk, St. Louis, MO (US);
Alexis Grabbe, St. Charles, MO (US)

(73) Assignee: SunEdison, Inc., St. Peters, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,531

(22) Filed: Jul. 18, 2014

(65) Prior Publication Data
US 2014/0328740 A1 Nov. 6, 2014

Related U.S. Application Data

(63) Continuation of application No. 12/978,209, filed on Dec. 23, 2010, now Pat. No. 8,821,825, and a continuation of application No. 13/715,642, filed on Dec. 14, 2012, which is a continuation of application No. 12/978,189, filed on Dec. 23, 2010, now Pat. No. 8,388,914.

(51) Int. Cl.
C01B 33/04 (2006.01)
C01B 33/029 (2006.01)

(52) U.S. Cl.
CPC ............. C01B 33/029 (2013.01); C01B 33/043 (2013.01)
USPC .......................................... 423/347; 423/344

(58) Field of Classification Search
USPC .................. 423/347, 344, 346, 342
See application file for complete search history.

(56) References Cited

U.S. PATENT DOCUMENTS

| 3,163,590 | A | 12/1964 | Litz et al. |
| 4,092,446 | A | 5/1978 | Padovani et al. |
| 4,318,942 | A | 3/1982 | Woerner et al. |
| 4,340,574 | A | 7/1982 | Coleman |
| 4,407,783 | A | 10/1983 | Ulmer et al. |
| 4,554,141 | A | 11/1985 | Scull et al. |
| 4,601,798 | A | 7/1986 | Jacubert et al. |
| 4,605,547 | A | 8/1986 | Dumousseau et al. |
| 4,632,816 | A | 12/1986 | Marlett |
| 4,676,967 | A | 6/1987 | Breneman |
| 4,818,495 | A | 4/1989 | Iya |
| 4,973,725 | A | 11/1990 | Lewis et al. |
| 5,075,092 | A | 12/1991 | Boone et al. |
| 5,206,004 | A | 4/1993 | Park |
| 5,211,931 | A | 5/1993 | Allen et al. |
| 5,904,821 | A | 5/1999 | Blank et al. |
| 5,910,295 | A | 6/1999 | DeLuca |
| 6,482,381 | B1 | 11/2002 | Sundermeyer et al. |
| 7,588,741 | B2 | 9/2009 | Dunn, Jr. et al. |
| 7,927,984 | B2 | 4/2011 | Molnar |
| 8,388,914 | B2 | 3/2013 | Gupta et al. |
| 8,821,825 | B2 * | 9/2014 | Gupta et al. ............ 423/347 |

FOREIGN PATENT DOCUMENTS

| CA | 1218828 | 3/1987 |
| DE | 4101687 C1 | 4/1992 |
| EP | 0111924 A2 | 6/1984 |
| EP | 0294908 A2 | 12/1988 |
| JP | 2001122610 | 5/2001 |
| WO | 2010136529 A1 | 12/2010 |

OTHER PUBLICATIONS

International Search Report and Written Opinion, Application No. PCT/US2011/064545, dated Feb. 27, 2012, pp. 11.
Co-Owned U.S. Appl. No. 13/715,642, filed Dec. 14, 2012, pp. 26.
Final Office Action, U.S. Appl. No. 13/715,642, dated Sep. 26, 2013, pp. 29.
Non-Final Office Action, U.S. Appl. No. 13/715,642, dated Jun. 2, 2014, pp. 21.
Non-Final Office Action, U.S. Appl. No. 12/978,189, dated Jul. 18, 2012, pp. 15.
Mohandas et al., Design, construction and operation of a laboratory scale electrolytic cell for sodium production us a beta-alumina based low-temperature process, Journal of Applied Electrochemistry, dated 2002, pp. 1383-1390.
NaCl—Na2CO3 Eutectic; Database: http://ras.material.tohoku.ac.jp/~molten/molten_eut_query1.php; Reported by Bergman, Zh. Neorg. Khim, 3, 383 (1958).
Muller et al., Development and Economic Evaluation of a Reactive Distillation Process for Silane Production, Distillation and Adsorption: Integrated Processes, Bayer AG, D-51368 Leverkuse (2002), pp. 11.
NaCl—CaCl2 Eutectic; Database: http://ras.material.tohoku.ac.jp/~molten/molten_eut_query1.php; Reported by Ryabov, Izv. Vyssh. Ucheb. Zaved. Tsvet. Metall., 3, 14 (1980).
Non-Final Office Action, U.S. Appl. No. 12/978,209, dated Nov. 26, 2013, pp. 5.
Notice of Allowance, U.S. Appl. No. 12/978,209, dated May 1, 2014, pp. 7.
Non-Final Office Action, U.S. Appl. No. 13/715,642, dated May 9, 2013, pp. 25.
Notice of Allowance, U.S. Appl. No. 12/978,189, dated Nov. 23, 2012, pp. 9.
Co-Owned U.S. Appl. No. 12/978,209, filed Dec. 23, 2010, pp. 33.

* cited by examiner

Primary Examiner — Edward Johnson
(74) Attorney, Agent, or Firm — Armstrong Teasdale LLP

(57) ABSTRACT

Methods and systems for producing silane that use electrolysis to regenerate reactive components therein are disclosed. The methods and systems may be substantially closed-loop with respect to halogen, an alkali or alkaline earth metal and/or hydrogen.

24 Claims, 5 Drawing Sheets

METHODS FOR PRODUCING SILANE

CROSS-REFERENCE TO RELATED APPLICATIONS

This application is a continuation of U.S. application Ser. No. 12/978,209, filed Dec. 23, 2010, which is incorporated herein by reference. This application is also a continuation of U.S. application Ser. No. 13/715,642, filed Dec. 14, 2012, which is a continuation of U.S. Pat. No. 8,388,914, filed Dec. 23, 2010, both of which are incorporated herein by reference.

BACKGROUND

The field of the present disclosure relates to methods for producing silane and, particularly, methods which include use of electrolysis to regenerate reactive components. Some particular embodiments are directed to methods in which the production of silane is substantially "closed-loop" with respect to halogen and/or to an alkali or alkaline earth metal.

Silane is a versatile compound that has many industrial uses. In the semiconductor industry, silane may be utilized for deposition of an epitaxial silicon layer on semiconductor wafers and for production of polycrystalline silicon. Polycrystalline silicon is a vital raw material used to produce many commercial products including, for example, integrated circuits and photovoltaic (i.e., solar) cells that may be produced by thermal decomposition of silane onto silicon particles in a fluidized bed reactor.

Silane may be produced by reacting silicon tetrafluoride with an alkali or alkaline earth metal aluminum hydride such as sodium aluminum tetrahydride as disclosed in U.S. Pat. No. 4,632,816 which is incorporated herein by reference for all relevant and consistent purposes. This process is characterized by high energy efficiency; however, starting material costs can negatively influence the economics of such a system.

Silane may alternatively be produced by the so-called "Union Carbide Process" in which metallurgical-grade silicon is reacted with hydrogen and silicon tetrachloride to produce trichlorosilane as described by Müller et al. in "Development and Economic Evaluation of a Reactive Distillation Process for Silane Production," *Distillation and Adsorption: Integrated Processes*, 2002, which is incorporated herein for all relevant and consistent purposes. The trichlorosilane is subsequently taken through a series of disproportionation and distillation steps to produce a silane end-product. This process requires a number of large recycle streams which increases the initial equipment costs as well as operating costs.

A continuing need therefore exists for economical methods for producing silane and for methods that are closed-loop with respect to certain materials used within the production process. A need also exists for systems for performing such methods including substantially closed-loop systems.

SUMMARY

One aspect of the present disclosure is directed to a process for producing silane from a source of alkali or alkaline earth metal halide salt. The process includes electrolyzing an alkali or alkaline earth metal halide salt to produce metallic alkali or alkaline earth metal and halogen gas. The metallic alkali or alkaline earth-metal is contacted with hydrogen to produce an alkali or alkaline earth metal hydride. A halogenated silicon feed gas containing at least one halosilane selected from the group consisting of silicon tetrahalide, trihalosilane, dihalosilane and monohalosilane is produced by contacting the halogen gas with at least one of (1) silicon to produce silicon tetrahalide and (2) hydrogen to produce a hydrogen halide, wherein the hydrogen halide is further contacted with silicon to produce a mixture containing silicon tetrahalide and trihalosilane. The halogenated feed gas is contacted with the alkali or alkaline earth metal hydride to produce silane and an alkali or alkaline earth-metal hydride salt.

Another aspect of the present disclosure is directed to a process for producing silane in a substantially closed-loop system with respect to alkali or alkaline earth metals. A halogenated silicon feed gas is contacted with an alkali or alkaline earth metal hydride to produce silane and an alkali or alkaline earth-metal halide salt. The halide salt is electrolyzed to produce metallic alkali or alkaline earth metal and halogen gas. The metallic alkali or alkaline earth-metal is contacted with hydrogen to produce an alkali or alkaline earth metal hydride. The alkali or alkaline earth-metal hydride produced by contacting the metallic alkali or alkaline earth metal and hydrogen is contacted with the halogenated silicon feed gas to produce silane and an alkali or alkaline earth-metal halide salt.

Yet a further aspect of the present disclosure is directed to a process for producing silane in a substantially closed-loop system with respect to halogens. A halogenated silicon feed gas containing at least one halosilane selected from the group consisting of silicon tetrahalide, trihalosilane, dihalosilane and monohalosilane is contacted with an alkali or alkaline earth metal hydride to produce silane and an alkali or alkaline earth-metal halide salt. The halide salt is electrolyzed to produce metallic alkali or alkaline earth metal and halogen gas. A halogenated silicon feed gas containing at least one halosilane selected from the group consisting of silicon tetrahalide, trihalosilane, dihalosilane and monohalosilane is produced by contacting the halogen gas with at least one of (1) silicon to produce silicon tetrahalide and (2) hydrogen to produce hydrogen halide, wherein the hydrogen halide is further contacted with silicon to produce a mixture comprising silicon tetrahalide and trihalosilane. The halogenated silicon feed gas is contacted with an alkali or alkaline earth metal hydride to produce silane and an alkali or alkaline earth-metal halide salt.

In another aspect of the present disclosure, a closed-loop process for producing polycrystalline silicon includes contacting a halogenated silicon feed gas containing at least one halosilane selected from the group consisting of silicon tetrahalide, trihalosilane, dihalosilane and monohalosilane with an alkali or alkaline earth metal hydride to produce silane and an alkali or alkaline earth-metal halide salt. Silane is thermally decomposed to produce polycrystalline silicon and hydrogen. The halide salt is electrolyzed to produce metallic alkali or alkaline earth metal and halogen gas. A halogenated silicon feed gas containing at least one halosilane selected from the group consisting of silicon tetrahalide, trihalosilane, dihalosilane and monohalosilane is produced by contacting the halogen gas produced by electrolyzing the alkali or alkaline earth metal halide with at least one of (1) silicon to produce silicon tetrahalide and (2) hydrogen to produce hydrogen halide, wherein the hydrogen halide is further contacted with silicon to produce a mixture containing silicon tetrahalide and trihalosilane. The metallic alkali or alkaline earth-metal is contacted with hydrogen produced from the thermal decompositions of silane to produce an alkali or alkaline earth metal hydride. The halogenated silicon feed gas produced by contacting halogen gas or hydrogen halide with silicon is contacted with the alkali or alkaline earth-metal hydride produced by contacting the metallic alkali or alkaline earth metal with hydrogen to produce silane and an alkali or alkaline earth-metal halide salt.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Methods of embodiments of the present disclosure use electrolysis to regenerate reactive components in a process for manufacturing silane. Electrolysis allows the silane production process to optionally be a substantially closed-loop system with respect to certain compounds used in the system such as, for example, halogens (e.g., chlorine) and/or an alkali or alkaline earth-metals (e.g., sodium). As used herein, the phrases "substantially closed-loop process" or "substantially closed-loop system" refers to a process or system in which the compound with respect to which the system or process is closed-loop is not withdrawn into the system or process other than as an impurity and is not fed into the system or process for purposes other than to make-up an amount of the compound that was lost in the system as an impurity (e.g., with the amount of compound being made-up being less than about 5% of the total circulating within the system as described more fully below).

In one or more embodiments of the present disclosure, silane is produced by electrolyzing an alkali or alkaline earth metal halide salt to produce metallic alkali or alkaline earth metal and halogen gas. The metallic alkali or alkaline metal is reacted with hydrogen to produce a hydride and the halogen gas is reacted with silicon (and additionally hydrogen in some embodiments) to produce a halogenated silicon feed gas containing silicon tetrahalide and, in some embodiments, trihalosilane. The feed gases are reacted to produce silane and a halide salt. In embodiments wherein the process is substantially closed loop with respect to at least one of the alkali or alkaline earth metals and the halogen gas, the halide salt by-product is recycled by electrolyzing the halide salt to produce metallic alkali or alkaline earth metal and halogen gas.

Use of Electrolysis to Produce Silane

Figure 1:
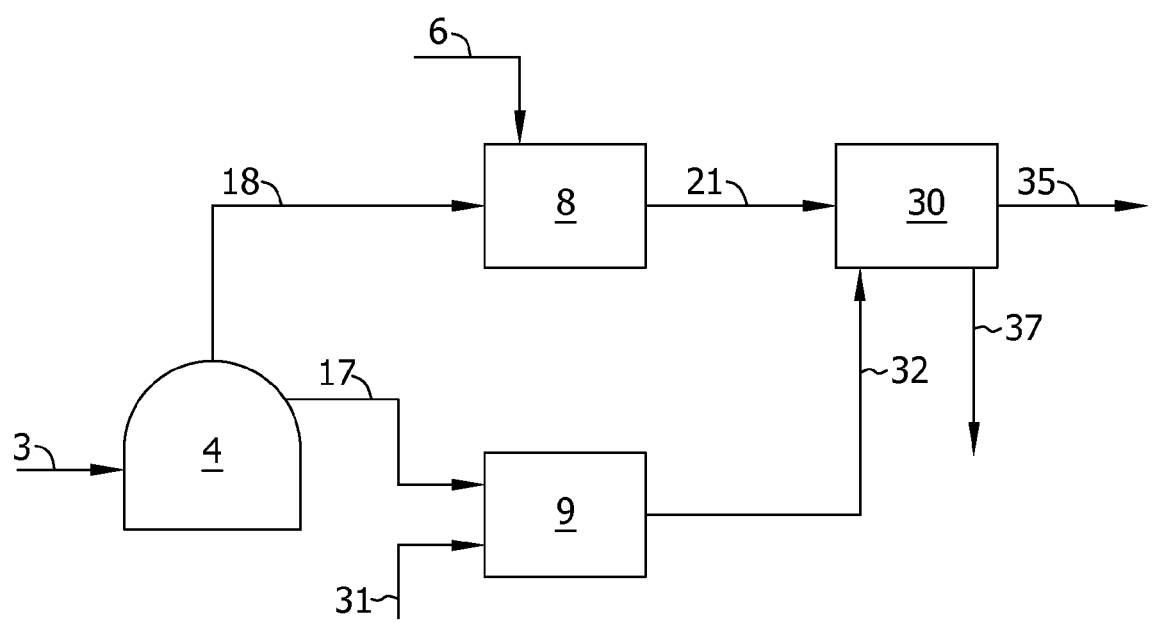
FIG. 1 is a schematic of a system for producing silane that involves electrolysis of a halide salt according to an embodiment of the present disclosure.

Referring now to FIG. 1, a halide salt 3 is introduced into a vessel 4 in which the halide salt is electrolyzed to produce a halogen gas (e.g., $Cl_2$) and metal (e.g., metallic alkali or alkaline earth metal). As used herein, "halide salts" contain an alkali or alkaline earth metal and a halogen. Halide salts may have the general formula, $MX_y$, wherein M is an alkali or alkaline earth metal, X is a halogen and y is 1 when M is an alkali and y is 2 when M is an alkaline earth metal. The alkali or alkaline earth-metal of the halide salt (and which is recycled within a closed loop system in certain embodiments as described below) may be selected from the group consisting of lithium, sodium, potassium, magnesium, barium, calcium and mixtures thereof. The halogen may be selected from fluorine, chlorine, bromine, iodine and mixtures thereof. In view of the wide availability of sodium chloride and in view that sodium chloride may be more readily separated into its constituent parts (e.g., chloride gas and sodium metal) relative to other halide salts, sodium is a preferred alkali or alkaline earth metal and chloride is a preferred halogen. In this regard, it should be understood that any alkali or alkaline earth metal may be used and any halogen may be used, particularly in embodiments wherein the process and system for producing silane is a closed loop with respect to the alkali or alkaline earth metal as described below.

Figure 2:
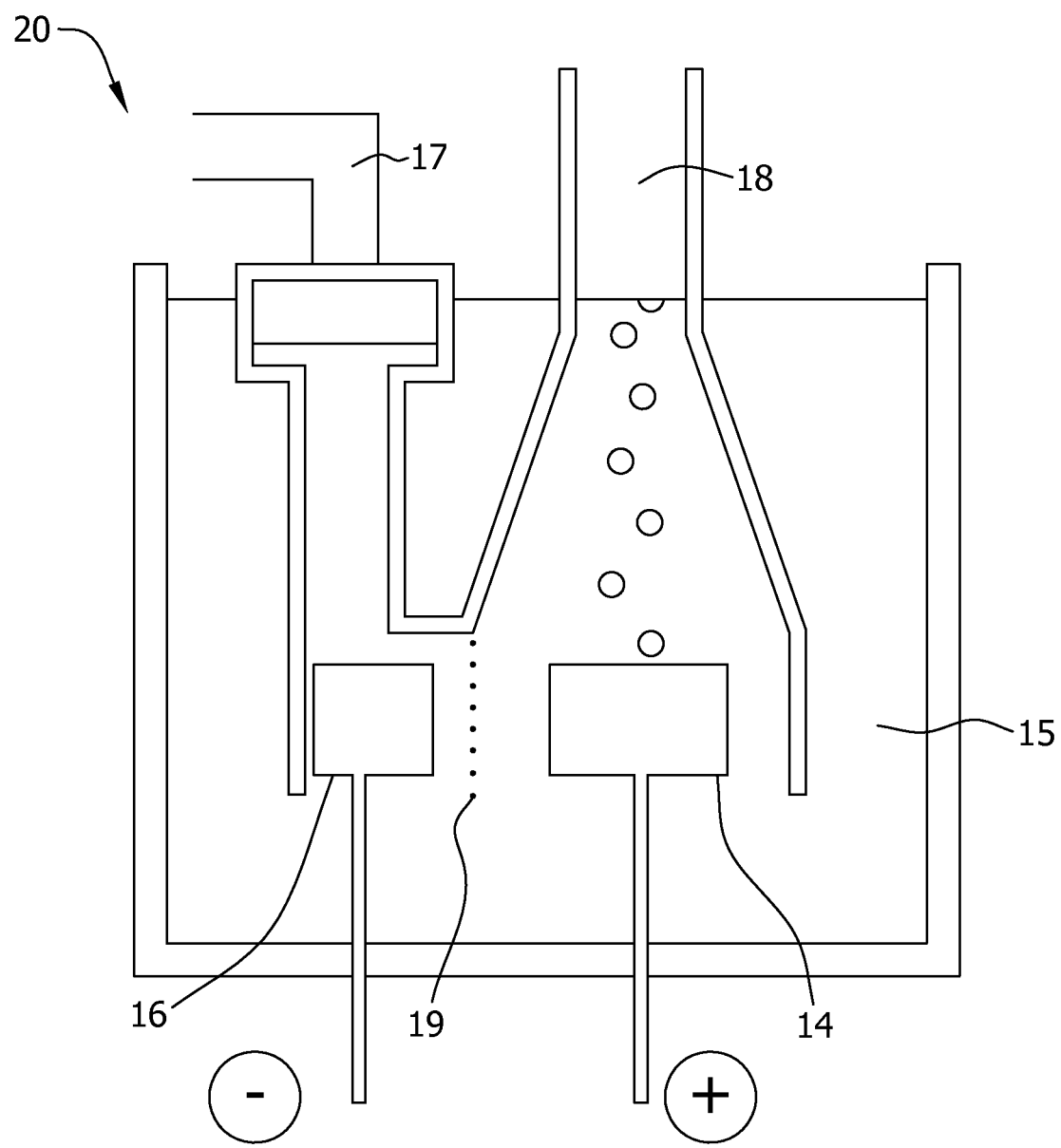
FIG. 2 is a cross-section of a Down's cell suitable for electrolyzing a halide salt.

One suitable vessel 4 in which the halide salt is electrolyzed is a Downs cell. An exemplary Downs cell is shown in FIG. 2 and is generally referenced by numeral "20". The Downs cell 20 includes one or more halide salts 15 therein and contains an anode 14 and cathode 16. The anode 14 may be composed of, for example, carbon (e.g., graphite) and the cathode 16 may composed of, for example, steel or iron. At the anode 14, chlorine ions are oxidized to form a halogen gas (e.g., $Cl_2$). At the cathode 16, the alkali or alkaline earth metal ions are reduced to form metallic alkali or alkaline earth metal. In this regard, it should be understood that as used herein, the term "metallic" refers to an alkali or alkaline earth metal with an oxidation number of 0. The halogen gas and metallic alkali or alkaline earth metal that form are divided by a separator 19. The separator 19 may be a screen or gauze that is made of steel or iron. In this regard it should be understood that electrolysis cells other than Downs cells may be used such as, for example, the electrolysis cell described in U.S. Pat. No. 5,904,821, which is incorporated herein by reference for all relevant and consistent purposes.

The metallic alkali or alkaline earth metal that is produced is less dense than the halide salt which causes it to rise in the cell. The halogen gas also rises and both the halogen gas 18 and metallic alkali or alkaline earth metal 17 are removed from the Downs cell. A second alkali or alkaline earth metal salt may be added to the Down's cell to form a eutectic mixture and suppress the melting point of the halide salt that is electrolyzed to reduce energy costs in melting the halide salt and/or maintaining the halide salt in a molten state. For instance, when sodium chloride is electrolyzed in the Down's cell 20, an amount of calcium chloride, aluminum chloride or sodium carbonate may be added to suppress the melting point of sodium chloride. For example, a mixture containing 53.2 mol % calcium chloride and 46.8 mol % sodium chloride has a melting point of 494° C. compared to the 801° C. melting point of sodium chloride alone and an exemplary mixture containing 23.1 mol % sodium carbonate and 76.9 mol % sodium chloride has a melting point of 634° C. Preferably the alkali or alkaline earth metal of the second salt is the same as the alkali or alkaline earth metal of the halide salt or is a weaker oxidant than the alkali or alkaline earth metal of the halide salt so as to not affect the reduction of the alkali or alkaline earth metal of the halide salt.

Referring again to FIG. 1, the halogen gas 18 is introduced into a halogenation reactor 8 where it is contacted with silicon 6 to produce a halogenated feed gas 21 containing silicon tetrahalide (e.g., SiCl$_4$). This reaction is illustrated below:

$$Si + 2X_2 \rightarrow SiX_4 \quad (1)$$

The source of silicon 6 may be metallurgical grade silicon; however, it should be understood that other sources of silicon may be used such as, for example, sand (i.e., SiO$_2$), quartz, flint, diatomite, mineral silicates, fluorosilicates and mixtures thereof. In this regard it should be understood that, as used herein, "contact" of two or more reactive compounds generally results in a reaction of the components and the terms "contacting" and "reacting" are synonymous as are derivations of these terms and these terms and their derivations should not be considered in a limiting sense.

Figure 3:
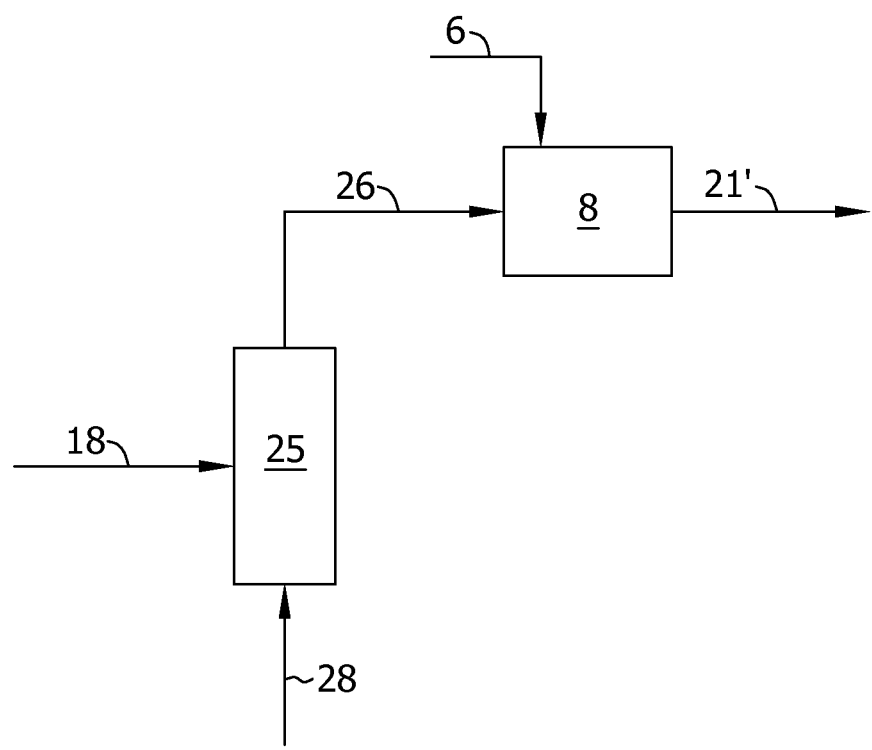
FIG. 3 is a schematic of a system for producing a halogenated silicon feed gas containing silicon tetrahalide and trihalosilane.

As an alternative to direct reaction with silicon and as shown in FIG. 3, the halogen gas 18 may be reacted with hydrogen 28 to form a hydrogen halide 26 (HX) in a hydrogen halide burner 25 (synonymously hydrogen halide "oven" or "furnace"). The hydrogen halide 26 may be reacted with silicon 6 in the halogenation reactor 8 to form a halogenated silicon feed gas 21' containing trihalosilane and silicon tetrahalide according to the reactions shown below:

$$Si + 3HX \rightarrow SiHX_3 + H_2 \quad (2)$$

$$Si + 4HX \rightarrow SiX_4 + 2H_2 \quad (3)$$

The molar ratio of silicon tetrahalide to trihalosilane in the halogenated silicon feed gas 21' may be variable and, in various embodiments, may be from about 1:7 to about 1:2 or from about 1:6 to about 1:3. In this regard, it should be understood that the reaction of silicon 6 with hydrogen halide 26 may also produce an amount of dihalosilane and/or monohalosilane without limitation.

In certain embodiments, reaction of halogen gas 18 with hydrogen 28 to form a hydrogen halide followed by reaction with silicon to form a mixture comprising trihalosilane and silicon tetrahalide (FIG. 3) is preferred compared to direct halogenation of silicon (FIG. 1) as less hydride is used to produce silane from trihalosilane than silicon tetrahalide as shown in Reactions 5-6ii below. Further, the direct halogenation reaction may require higher temperatures relative to reaction of hydrogen halide with silicon and may be more difficult to control.

The source of hydrogen 28 may be selected from the sources described below in regard to hydrogen feed 31. Optionally, the source of hydrogen 28 may be hydrogen recycled with the halogenated feed gas 21' or hydrogen that is separated from the halogenated silicon feed gas 21'. Hydrogen may be separated from the halogenated silicon feed gas 21' by use of a vapor-liquid separator (not shown). Examples of such vapor-liquid separators include vessels in which the pressure and/or temperature of the incoming gas is reduced causing the lower boiling-point gases (e.g., silicon tetrahalide and/or trihalosilane) to condense and separate from higher boiling point gases (e.g., hydrogen). Suitable vessels include vessels which are commonly referred to in the art as "knock-out drums." Optionally, the vessel may be cooled to promote separation of gases. Alternatively, the hydrogen may be separated by one or more distillation columns.

As an alternative to reaction of hydrogen and halogen in a hydrogen halide burner followed by reaction of hydrogen halide and silicon in a halogenation reactor as shown in FIG. 3, hydrogen gas, halogen gas and silicon may be reacted in one vessel to produce a mixture comprising trihalosilane and silicon tetrahalide. In this regard, it should be understood that while preparation of hydrogen halide has generally been described with reference to anhydrous hydrogen halide gas, in some embodiments, an aqueous hydrogen halide and, in particular, aqueous HF may be produced which may be reacted with silicon to produce a mixture comprising trihalosilane and silicon tetrahalide by methods known to those of skill in the art. Further in this regard, while the reaction product of hydrogen halide and silicon has been described as a mixture comprising trihalosilane and silicon tetrahalide, it should be understood that the reaction parameters may be controlled to produce silicon tetrahalide and only minor amounts of trihalosilane (e.g., less than about 5 vol % or less than about 1 vol %) or to produce trihalosilane with minor amounts of silicon tetrahalide (e.g., less than about 5 vol % or less than about 1 vol %).

The halogenation reactor 8 may operated as a fluidized bed in which silicon is suspended in the incoming gases (e.g., halogen 18 (FIG. 1) or hydrogen halide 26 (FIG. 3)). The halogenation reactor 8 may be operated at room temperature (e.g., about 20° C.), particularly when fluorine is chosen as the halogen. More generally, the reactor may be operated at a temperature of at least about 20° C., at least about 75° C., at least about 150° C., at least about 250° C., at least about 500° C., at least about 750° C., at least about 1000° C. or at least about 1150° C. (e.g., from about 20° C. to about 1200° C., from about 250° C. to about 1200° C. or from about 500° C. to about 1200° C.). The reactor 8 may be operated at a pressure of at least about 1 bar, at least about 3 bar or even at least about 6 bar (e.g., from about 1 bar to about 8 bar or from about 3 bar to about 8 bar).

In this regard, it should be understood that the halogenated silicon feed stream 21 shown in FIG. 1 and halogenated silicon feed stream 21' shown in FIG. 3 may contain halosilanes other than silicon tetrahalide or trihalosilane such as amounts of monohalosilane and/or dihalosilane. Further, the halogenated silicon feed stream 21 or halogenated silicon feed stream 21' may be introduced into a disproportionation system (not shown) to produce amounts of trihalosilane, dihalosilane and/or monohalosilane. It should be understood that, as used herein, "halogentated silicon feed gas" includes any gas that contains any amount of one or more halosilanes (i.e., silicon tetrahalide, trihalosilane, dihalosilane, or monohalosilane) and includes both gases that have not been introduced into a disproportionation system and that have been introduced into a disproportionation system.

Referring again to FIG. 1, the halogenated silicon feed stream 21 (or halogenated silicon feed stream 21' as in FIG. 3) is introduced into a silane reactor 30 to produce silane 35. Prior to introduction into the silane reactor 30, the halogenated silicon feed gas 21 (or feed gas 21' containing both silicon tetrahalide and trihalosilane) may be purified to remove impurities such as, for example, aluminum halides or iron halides (e.g., AlCl$_3$ and/or FeCl$_3$ when the halide is chlorine) and/or silicon polymers (e.g., Si$_n$Cl$_m$ polymers when the halide is chlorine). These impurities may be removed by cooling the gas to precipitate the impurities out of the system. The precipitated impurities may be removed by introducing the gas into a particulate separator such as a bag filter or cyclonic separator. To precipitate the impurities (e.g., metal halides and/or silicon polymers) the halogenated silicon feed gas 21 (or silicon tetrahalide and/or trihalosilane mixture 21') may be cooled to a temperature less than about 200° C. or, as in other embodiments, less than about 175° C., less than about 150° C. or even less than about 125° C. (e.g., from about 100° C. to about 200° C. or from about 125° C. to about 175° C.).

The gas may be cooled by exchanging heat with cooling water or cooling oil in a heat exchange apparatus and/or chiller apparatus. After impurity removal, the halogenated silicon feed gas 21 (or silicon tetrahalide and/or trihalosilane mixture 21') may contain less than 10 vol % impurities (i.e., compounds other than halosilanes) or even less than about 5 vol %, less than about 1 vol %, less than about 0.1 vol % or even less than about 0.01 vol % impurities (e.g., from 0.001 vol % to about 10 vol % or from about 0.001 vol % to about 1 vol %).

The metallic alkali or alkaline earth metal 17 that is produced as an electrolysis product is introduced into a hydride reactor 9. An amount of hydrogen 31 is also introduced into the hydride reactor 9. Reaction between metallic alkali or alkaline earth metal and hydrogen produces an alkali or alkaline earth metal hydride 32 as shown in the reaction below:

$$(2/y)M + H_2 \rightarrow (2/y)MH_y \tag{4}$$

wherein y is 1 when M is an alkali and y is 2 when M is an alkaline earth metal. For instance, when M is Na, the reaction proceeds as follows, $$2Na + H_2 \rightarrow 2NaH \tag{4i}$$

When M is Ca, the reaction proceeds as follows, $$Ca + H_2 \rightarrow CaH_2 \tag{4ii}$$

Reaction (4) may occur in the presence of a solvent within the hydride reactor 9. Suitable solvents include various hydrocarbon compounds such as toluene, dimethyl ether, diglyme and ionic liquids such as $NaAlCl_4$. In embodiments where $NaAlCl_4$ is used, the hydride reactor 9 may include electrodes. Once the supply of alkali or alkaline earth metal hydride is exhausted, the electrodes may be energized to cause sodium (including an amount of sodium from $NaAlCl_4$) and $H_2$ to react and regenerate the hydride compound. In embodiments wherein $NaAlCl_4$ is used as a solvent, other ionic compounds may be added to form a eutectic mixture as disclosed in U.S. Pat. No. 6,482,381, which is incorporated herein for all relevant and consistent purposes.

The hydride reactor 9 may be a stirred tank reactor to which an amount of solvent (not shown) and metallic alkali or alkaline earth metal 17 is added. Hydrogen 31 may be bubbled through the reaction mixture to form the alkali or alkaline earth metal hydride 32 in batch-mode or in a semi-continuous or continuous process. Suitable sources of hydrogen 31 include hydrogen obtained commercially or hydrogen obtained from other process streams. For instance, hydrogen may be separated (e.g., vapor-liquid separator as described above) from the trihalosilane and silicon tetrahalide mixture 21' in embodiments where hydrogen halide is reacted with silicon. Alternatively or in addition, hydrogen released from silane during the downstream production of polycrystalline silicon may be used. The amount of solvent, hydrogen 31 and metallic alkali or alkaline earth-metal 17 added to the reactor 9 may be chosen such that the weight ratio of the amount of hydride to the solvent in the reactor 9 may be at least about 1:20 and, in other embodiments, at least about 1:10, at least about 1:5, at least about 1:3, at least about 2:3 or even at least about 1:1 (e.g., from about 1:20 to about 1:1 or from about 1:10 to about 2:3).

In one or more embodiments, the reaction mixture in reactor 9 is well-mixed using, for example one or more a relatively high agitation mixers, having one or more impellers. Relatively high agitation allows the hydrogen to be well dispersed throughout the reaction mixture so as to maximize the rate of hydrogen dissolution and also shears any solid alkali or alkaline earth metal hydride from the metallic alkali or alkaline earth metal so as to allow the liquid alkali or alkaline earth metal to be continuously available to react with the dissolved hydrogen. In this regard and without being bound to any particular theory, mass transfer in the hydride reactor depends on liquid side resistance with the volumetric gas-liquid mass transfer coefficient ($K_L a_G$) expected to be between about 100 to about 100,0000 $s^{-1}$ and, more typically, between about 1,000 and about 10,000 $s^{-1}$. It should be noted that the particular volumetric gas-liquid mass transfer coefficient ($K_L a_G$) may vary depending on the particular hydride and solvent chosen for use in the reactor 9. Such values may be readily be determined by those of skill in the art according to known methodologies (e.g., measuring hydrogen uptake as a function of time).

In several embodiments of the present disclosure, the hydride reactor 9 is operated under high pressure conditions such as pressures of at least about 50 bar, at least about 125 bar, at least about 200 bar, at least about 275 bar or at least about 350 bar (e.g., from about 50 bar to about 350 bar or from about 50 bar to about 200 bar). The hydride reactor 9 may be operated at a temperature less than the thermal decomposition of alkali or alkaline earth metal halide such as temperatures less than about 160° C., less than about 145° C. or less than about 130° C. (e.g., from about 120° C. to about 160° C.).

The alkali or alkaline earth metal hydride 32 is typically a solid in organic solvents. A slurry containing the alkali or alkaline earth metal hydride 32 suspended in the solvent may be introduced into the silane reactor 30 to produce silane 35. In this regard, it should be understood that in certain other embodiments of the present disclosure, the alkali or alkaline earth metal hydride 32 may be introduced into the silane reactor 30 as a solid or caked solid which contain lesser amounts of solvent. The alkali or alkaline earth metal may be separated from the solvent by centrifugation or filtration or by any other suitable method available to those of skill in the art. In this regard, it should be understood that solvents other than organic solvents (e.g., $NaAlCl_4$) may be used without limitation.

As described above, silicon tetrahalide from the hydrogenated silicon feed gas 21 (or a mixture comprising silicon tetrahalide and trihalosilane 21' as in FIG. 3) and alkali or alkaline earth metal hydride 32 are introduced into a silane reactor 30 to produce silane 35 and halide salt 37 according to the reactions shown below:

$$(4/y)MH_y + SiX_4 \rightarrow (4/y)MX_y + SiH_4 \tag{5}$$

$$3MH_y + ySiHX_3 \rightarrow 3MX_y + ySiH_4 \tag{6}$$

wherein y is 1 when M is an alkali and y is 2 when M is an alkaline earth metal. For instance, when M is Na and X is Cl, the reactions proceed as follows, $$4NaH + SiCl_4 \rightarrow 4NaCl + SiH_4 \tag{5i}$$

$$3NaH + SiHCl_3 \rightarrow 3NaCl + SiH_4 \tag{6i}$$

When M is Ba and X is Cl, the reactions proceed as follows, $$2BaH_2 + SiCl_4 \rightarrow 2BaCl_2 + SiH_4 \tag{5ii}$$

$$3BaH_2 + 2SiHCl_3 \rightarrow 3BaCl_2 + 2SiH_4 \tag{6ii}$$

The silane reactor 30 may be a stirred tank reactor (e.g., impeller agitated). The alkali or alkaline earth metal hydride 32 added to the reactor 30 may be suspended in an amount of the solvent (e.g., toluene) in which it was produced (e.g., by reaction of an alkali or alkaline earth metal and hydrogen). The silicon tetrahalide and/or trihalosilane 31 may be bubbled through the hydride slurry and, preferably, in a counter-current relationship. The weight ratio of hydride 32 added to the reactor 30 to the amount of solvent added to the reactor may be at least about 1:20 and, in other embodiments, at least about 1:10 or at least about 1:5 (e.g., from about 1:20 to about 1:5 or from about 1:20 to about 2:10). Silicon tetrahalide from halogenated silicon feed gas 21 (FIG. 1) or silicon tetrahalide and trihalosilane from halogenated silicon feed gas 21' (FIG. 3) may be added in a substantially stoichiometric ratio relative to hydride 32 with the molar ratios being shown in reactions (5) to (6ii) above.

An amount of catalyst such as, for example, tri-ethyl aluminum, various lewis acids or trace alkali metals (e.g., impurity lewis acids such as metal chlorides) may be added to the reactor 30. Such catalysts reduce the temperature at which reactions (5) and (6) achieve sufficient conversion and may reduce the amount of heat input into the system. In embodiments wherein a catalyst is not employed, the reactor 30 may be operated at temperatures of at least about 120° C. (e.g., from about 120° C. to about 225° C. or from about 140° C. to about 200° C.); whereas, in embodiments wherein a catalyst is used, the reactor 30 may be operated at a relatively cooler temperature of at least about 30° C. (e.g., from about 30° C. to about 125° C., from about 40° C. to about 100° C. or from about 40° C. to about 80° C.). The average residence time for materials added to the reactor 30 may be from about 5 minutes to about 60 minutes.

The silane gas 35 may be relatively pure (e.g., contain less than about 5 vol % or even less than about 2 vol % compounds other than silane). After silane gas 35 is removed from the reactor 30, the silane gas 35 may be subjected to further processing. For example, silane 35 may be purified (e.g., to remove compounds such as boron halides or phosphorous halides) by introduction into one or more distillation columns and/or molecular sieves to remove impurities as disclosed in U.S. Pat. No. 5,211,931, U.S. Pat. No. 4,554,141 or U.S. Pat. No. 5,206,004, each of which is incorporated herein by reference for all relevant and consistent purposes, or by any of the other known methods available to those of skill in the art.

The silane gas 35 may be used to prepare polycrystalline silicon (e.g., granular or chunk polycrystalline silicon) or may be used to prepare one or more epitaxial layers on silicon wafers. The silane gas may be stored and/or transported before use as appreciated by those of skill in the art.

The reaction of alkali or alkaline earth-metal hydride and silicon tetrahalide in the halogenated silicon feed gas 21 (or mixture 21' comprising trihalosilane and silicon tetrahalide) produces an alkali or alkaline earth metal halide salt 37 as a by-product. The halide salt 37 may be dissolved and, more typically, suspended in the solvent (e.g., toluene) in embodiments where solvents are used. The halide salt 37 may be separated from the solvent and sold commercially or recycled for use as further described below.

Substantially Closed-Loop Process for Producing Silane

Figure 4:
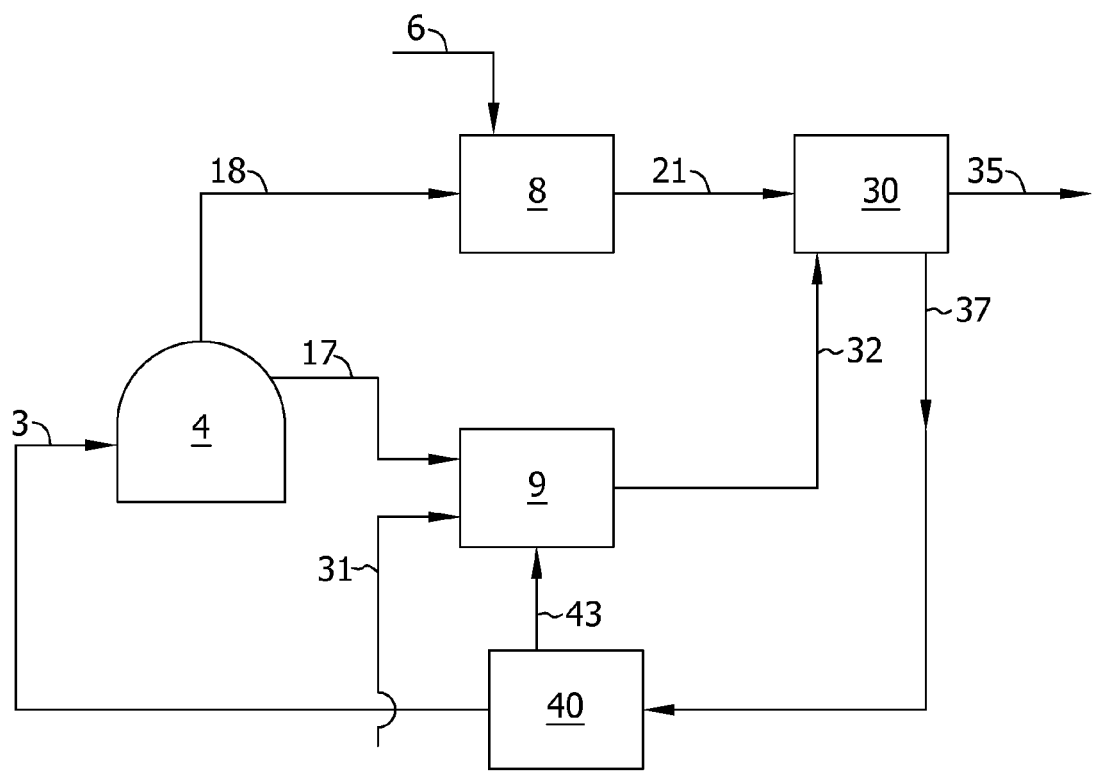
FIG. 4 is a schematic of a substantially closed-loop system for producing silane according to an embodiment of the present disclosure.

The process described above may be incorporated into a substantially closed-loop process for producing silane. The process above may be closed-loop with respect to alkali or alkaline-earth metals and/or with respect to halogens. Referring now to FIG. 4, the halide salt 37 may be separated from solvent by use of a separator 40. The separator 40 may be an evaporator or other suitable equipment may be used including crystallizers, filtration and/or gravity-based separators (e.g., centrifuges) in addition or alternatively to an evaporator. Suitable evaporators include wiped-film evaporators. After separation, the dried halide salt may be heated (e.g., up to 500° C.) to remove trace solvent.

The solvent 43 may be condensed and reintroduced into the hydride reactor 9 and/or into the silane reactor 30. The separated halide salt 3 may be used as the feed 3 for electrolysis such that alkali or alkaline earth-metal and/or halide is substantially recycled throughout the system.

In this regard, it should be understood that the substantially closed-loop process shown in FIG. 4 may be modified to include a hydrogen halide burner 25 to produce a gas 21' containing silicon tetrahalide and trihalosilane as in FIG. 3.

As shown in FIG. 4, the process is substantially closed loop with respect to alkali or alkaline earth-metal and with respect to halogens in that the system does include alkali or alkaline earth-metal or halogen (i.e., either alone or as within alkali or alkaline earth metal or halogen containing compounds) in any of the inlet streams 6, 31 and in that alkali or alkaline earth-metal and halogen are not removed in outlet stream 35. In this respect, it should be understood that alkaline or alkaline earth metals and/or halogens may be removed from the system as an impurity or may be included in a purge stream and may be fed into the system or process as in a make-up stream. Any make-up of alkali or alkaline earth metal and/or halogen may be achieved by addition to the system of compounds which contain the respective elements and, in certain embodiments, by the respective hydride salt itself. In various embodiments, the amount of alkali or alkaline earth-metal and/or halogen gas made up to the system (which may be added as an alkali or alkaline earth metal salt) is less than about 5% of the total circulating within the system and, in other embodiments, less than about 2% of the total circulating within the system (e.g., from about 0.5% to about 5%).

Figure 5:
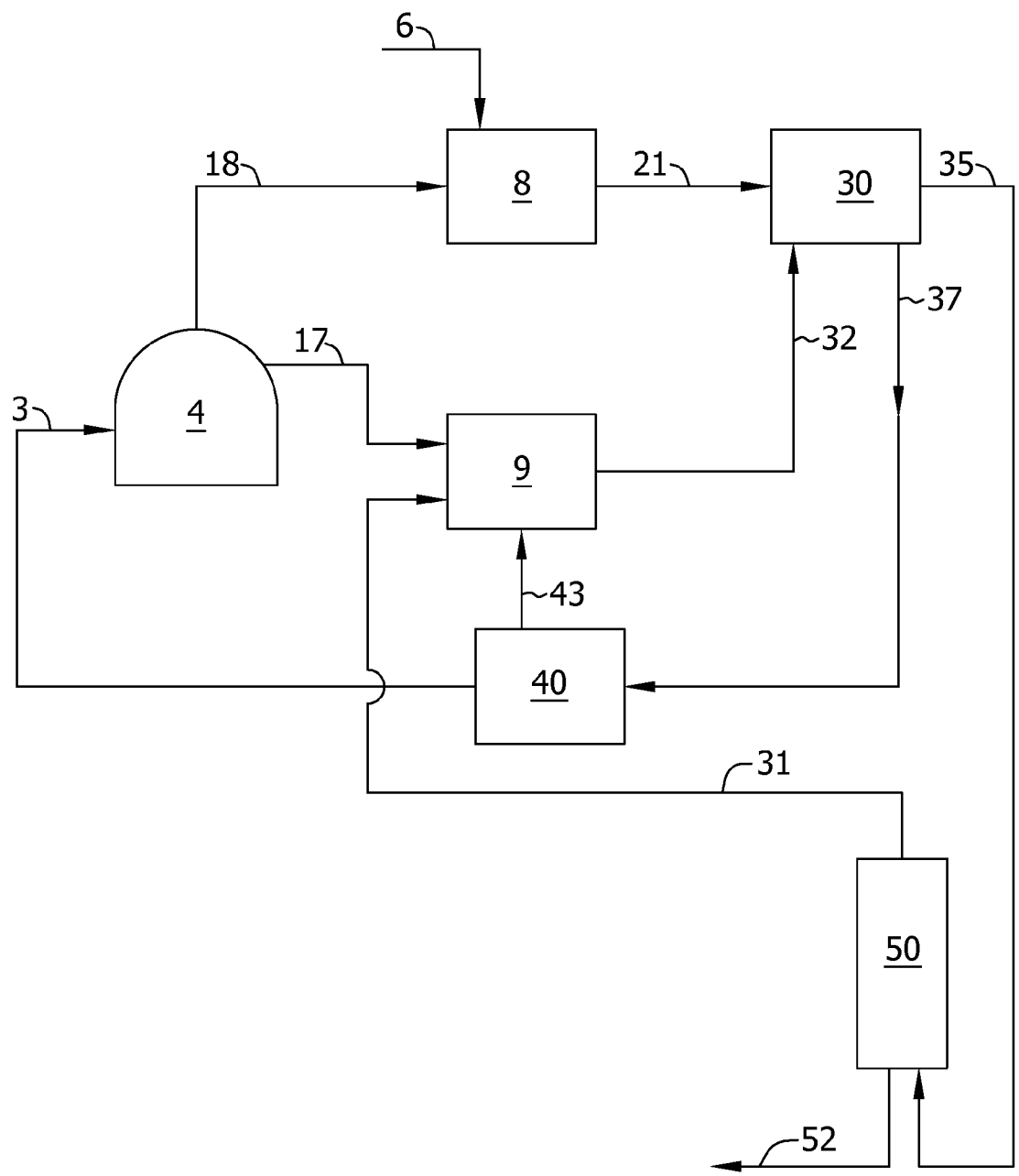
FIG. 5 is a schematic of a substantially closed-loop system for producing polycrystalline silicon according to an embodiment of the present disclosure.

In some embodiments of the present disclosure, the system and process may be substantially closed loop with respect to hydrogen. For instance, as shown in FIG. 5, silane 35 exiting the silane reactor 30 may be introduced into a polycrystalline reactor 50, preferably after purification to remove trace silanes, carbon compounds, trace metals and any dopant boron, phosphorous or aluminum compounds (e.g., by cryogenic activated carbon adsorbers). The polycrystalline reactor 50 may be a fluidized bed (e.g., to produce granular polycrystalline silicon) or a Siemens reactor (e.g., to produce chunk polycrystalline silicon) or may incorporate any other reactor design suitable for producing polycrystalline silicon. Silane thermally decomposes to produce polycrystalline silicon according to the following reaction:

$$SiH_4 \rightarrow Si + 2H_2 \qquad (7)$$

Silane may undergo further processing such as various purification steps as described above before addition to the polycrystalline reactor 50. The reaction products of the reactor 50 include polycrystalline silicon 52 and hydrogen 31. As shown in FIG. 5, hydrogen 31 is introduced into the hydride reactor 9. Hydrogen 31 may be further processed by separating out silicon dust and by purification (e.g., distillation) prior to introduction into the hydride reactor 9. As shown in FIG. 5, the only input into the system is silicon 6 and the only output is polycrystalline silicon 52. The system is substantially closed loop with respect to hydrogen in that hydrogen is only removed as an impurity or as a purge stream (not shown) and is only added as a make-up stream (not shown).

Substantially Closed-Loop System for Producing Silane

The processes of the present invention may be carried out in a system for producing silane, such as, for example, any one of the systems illustrated in FIGS. 1-5. The system may be substantially closed-loop with respect to one or more of halogens, alkali or alkaline earth metal and hydrogen.

Referring to FIG. 1, the system may include a vessel 4 (e.g., a Downs cell) for electrolyzing a halide salt to produce metallic alkali or alkaline earth metal and halogen gas. The halogen gas is conveyed by a conveying apparatus to at least one of (1) a hydrogen halide burner 25 to be reacted with hydrogen and produce hydrogen halide (FIGS. 3) and (2) halogenation reactor 8 to react with silicon (which is conveyed by a conveying apparatus form silicon storage to the halogenation reactor 8) and produce silicon tetrahalide. In embodiments wherein halogen gas is reacted to produce hydrogen halide, the hydrogen halide may then by conveyed by a conveying apparatus to the halogenation reactor 8 to produce a mixture comprising silicon tetrahalide and trihalosilane. Any silicon tetrahalide and/or trihalosilane gas that is produced is conveyed by a conveying apparatus to a silane reactor 30.

The system also includes a hydride reactor 9 (e.g., stirred tank reactor). The metallic alkali or alkaline earth metal is conveyed from the vessel by a conveying apparatus to the hydride reactor 9. Hydrogen gas is also conveyed by a conveying apparatus to the hydride reactor 9 to react with the metallic alkali or alkaline earth metal to produce an alkali or alkaline earth metal hydride. The system includes a silane reactor 30 (e.g., a stirred-tank reactor) to which the hydride (any solvent, if any) is conveyed by a conveying apparatus. The hydride reacts with the silicon tetrahalide and/or trihalosilane gas to form halide salt in the silane reactor 30, optionally in the presence of a solvent.

In various embodiments and as shown in FIG. 4, the solvent and halide salt may be conveyed by a conveying apparatus to a separator 40 for separating any solvent from the halide salt. The solvent may be conveyed by a conveying apparatus to the hydride reactor 9 and the halide salt may be conveyed by a conveying apparatus to the vessel 4 (e.g., Downs cell) for recycle and to complete the substantially closed-loop system with respect to halogen and alkali or alkaline earth metal.

In several further embodiments, the system also includes a polycrystalline reactor 50 which may be a Siemens-type reactor or a fluidized bed reactor. Silane is conveyed from the silane reactor 30 to the polycrystalline reactor 50 by a conveying apparatus to produce hydrogen and polycrystalline silicon. Hydrogen may be conveyed by a conveying apparatus from the polycrystalline reactor 50 to the hydride reactor 9 to recycle hydrogen and complete the substantially closed-loop system with respect to hydrogen.

Suitable conveying apparatus are conventional and well known in the art. Suitable conveying apparatus for the transfer of gases include, for example, compressor or blower and suitable conveying apparatus for transfer of solids include, for example, drag, screw, belt and pneumatic conveyors. In this regard, it should be understood that, use of the phrase "conveying apparatus" herein is not meant to imply direct transfer from one unit of the system to another but rather only that the material is transferred from unit to another by any number of indirect transfer parts and/or mechanisms. For instance, material from one unit may be conveyed to further processing units (e.g., purification or storage units used to provide a buffer between continuous or batch-wise processes) and then conveyed to the second unit. In this example, each unit of conveyance including the intermediate processing equipment itself may be considered to be the "conveying apparatus" and the phrase "conveying apparatus" should not be considered in a limiting sense.

Preferably, all equipment utilized in the system for producing silane is resistant to corrosion in an environment that includes exposure to compounds used and produced within the system. Suitable materials of construction are conventional and well-known in the field of the disclosure and include, for example, carbon steel, stainless steel, MONEL alloys, INCONEL alloys, HASTELLOY alloys, nickel and non-metallic materials such as quartz (i.e., glass), and fluorinated polymers such as TEFLON, KEL-F, VITON, KALREZ and AFLAS.

It should be understood that the processes and systems described above may include more than one of any of the recited units (e.g., reactors and/or separation units) and that multiple units may be operated in series and/or in parallel without departing from the scope of the present disclosure. Further in this regard, it should be understood that the process and systems that are described are exemplary and the processes and systems may include additional units which carry additional functions without limitation.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A closed-loop process for producing polycrystalline silicon, the process comprising:
    contacting a halogenated silicon feed gas comprising at least one halosilane selected from the group consisting of silicon tetrahalide, trihalosilane, dihalosilane and monohalosilane with an alkali or alkaline earth metal hydride to produce silane and an alkali or alkaline earth-metal halide salt;
    thermally decomposing silane to produce polycrystalline silicon and hydrogen;
    electrolyzing the halide salt to produce metallic alkali or alkaline earth metal and halogen gas; and
    producing a halogenated silicon feed gas comprising at least one halosilane selected from the group consisting of silicon tetrahalide, trihalosilane, dihalosilane and monohalosilane by contacting the halogen gas produced by electrolyzing the alkali or alkaline earth metal halide with at least one of:
    (1) silicon to produce silicon tetrahalide; and
    (2) hydrogen to produce hydrogen halide, wherein the hydrogen halide is further contacted with silicon to produce a mixture comprising silicon tetrahalide and trihalosilane;
    contacting the metallic alkali or alkaline earth-metal with hydrogen produced from the thermal decompositions of silane to produce an alkali or alkaline earth metal hydride;
    contacting the halogenated silicon feed gas produced by contacting halogen gas or hydrogen halide with silicon with the alkali or alkaline earth-metal hydride produced by contacting the metallic alkali or alkaline earth metal with hydrogen to produce silane and an alkali or alkaline earth-metal halide salt.

2. The process as set forth in claim 1 wherein silane is introduced into a fluidized bed reactor to deposit silicon on silicon seed particles fluidized therein.

3. The process as set forth in claim 1 comprising introducing the halogenated silicon feed gas into a disproportionation system prior to contacting the halogenated silicon feed gas with the alkali or alkaline earth metal hydride.

4. The process as set forth in claim 1 wherein the metallic alkali or alkaline earth-metal is contacted with hydrogen in a solvent selected from the group consisting of toluene, dimethyl ether, diglyme, $NaAlCl_4$ and mixtures thereof, the metallic alkali or alkaline earth-metal being added to a reaction vessel containing the solvent to form a reaction mixture, wherein hydrogen gas is bubbled through the reaction mixture.

5. The process as set forth in claim 1 wherein the alkali or alkaline earth-metal hydride is contacted with the halogenated silicon feed gas in a solvent selected from the group consisting of toluene, dimethyl ether, diglyme, $NaAlCl_4$ and mixtures thereof.

6. The process as set forth in claim 5 wherein the solvent contains a catalyst.

7. The process as set forth in claim 4 wherein spent solvent comprising the halide salt and the solvent is produced upon contacting the alkali or alkaline earth-metal hydride with the halogenated silicon feed gas, the method comprising regenerating the solvent by separating the halide salt and the solvent.

8. The process as set forth in claim 4 wherein the halide salt and solvent are separated by evaporating the solvent from the salt and condensing the solvent after evaporation.

9. The process as set forth in claim 1 wherein the halogenated silicon feed gas comprises one or more metal halide impurities, the method comprising cooling the halogenated silicon feed gas to precipitate the metal halide impurities.

10. The process as set forth in claim 1 wherein halide salt is electrolyzed by:
    introducing the salt to a vessel containing a cathode, an anode, and a separator disposed between the cathode and anode;
    applying current to the cathode and anode to produce halogen gas and metallic alkali or alkaline earth metal; and
    discharging halogen gas and metallic alkali or alkaline earth metal from the vessel.

11. The process as set forth in claim 1 wherein granular silicon and at least one of halogen gas and hydrogen halide are introduced into a fluidized bed reactor wherein the halogen gas or hydrogen halide fluidize the granular silicon in the reactor.

12. The process as set forth in claim 1 wherein the alkali or alkaline earth metal is selected from the group consisting of lithium, sodium, potassium, magnesium, barium, calcium and mixtures thereof.

13. The process as set forth in claim 1 wherein the alkali or alkaline earth metal is sodium.

14. The process as set forth in claim 1 wherein the alkali or alkaline earth metal halide salt comprises a halogen selected from the group consisting of fluorine, chlorine, bromine, iodine and mixtures thereof.

15. The process as set forth in claim 1 wherein the alkali or alkaline earth metal halide salt comprises chlorine.

16. A process for producing silane from a source of alkali or alkaline earth metal halide salt, the process comprising:
    electrolyzing an alkali or alkaline earth metal halide salt to produce metallic alkali or alkaline earth metal and halogen gas;
    contacting the metallic alkali or alkaline earth-metal with hydrogen to produce an alkali or alkaline earth metal hydride;
    producing a halogenated silicon feed gas comprising at least one halosilane selected from the group consisting of silicon tetrahalide, trihalosilane, dihalosilane and monohalosilane by contacting the halogen gas with at least one of:
    (1) silicon to produce silicon tetrahalide; and
    (2) hydrogen to produce a hydrogen halide, wherein the hydrogen halide is further contacted with silicon to produce a mixture comprising silicon tetrahalide and trihalosilane; and
    contacting the halogenated silicon feed gas with the alkali or alkaline earth metal hydride to produce silane and an alkali or alkaline earth-metal hydride salt, wherein (1) the metallic alkali or alkaline earth-metal is contacted with hydrogen in a solvent or (2) the alkali or alkaline earth-metal hydride is contacted with the halogenated silicon feed gas in a solvent.

17. The process as set forth in claim 16 wherein the metallic alkali or alkaline earth-metal is contacted with hydrogen in a solvent, the metallic alkali or alkaline earth-metal being added to a reaction vessel containing the solvent to form a reaction mixture and wherein hydrogen gas is bubbled through the reaction mixture.

18. The process as set forth in claim 16 wherein the alkali or alkaline earth-metal hydride is contacted with the halogenated silicon feed gas in a solvent.

19. A process for producing silane in a substantially closed-loop system with respect to alkali or alkaline earth metals, the process comprising:
    contacting a halogenated silicon feed gas with an alkali or alkaline earth metal hydride to produce silane and an alkali or alkaline earth-metal halide salt;
    electrolyzing the halide salt to produce metallic alkali or alkaline earth metal and halogen gas;
    contacting the metallic alkali or alkaline earth-metal with hydrogen to produce an alkali or alkaline earth metal hydride; and
    contacting the alkali or alkaline earth-metal hydride produced by contacting the metallic alkali or alkaline earth metal and hydrogen with the halogenated silicon feed gas to produce silane and an alkali or alkaline earth-metal halide salt, wherein (1) the metallic alkali or alkaline earth-metal is contacted with hydrogen in a solvent or (2) the alkali or alkaline earth-metal hydride is contacted with the halogenated silicon feed gas in a solvent.

20. The process as set forth in claim 19 wherein the metallic alkali or alkaline earth-metal is contacted with hydrogen in a solvent, the metallic alkali or alkaline earth-metal being added to a reaction vessel containing the solvent to form a reaction mixture, wherein hydrogen gas is bubbled through the reaction mixture.

21. The process as set forth in claim 19 wherein the alkali or alkaline earth-metal hydride is contacted with the halogenated silicon feed gas in a solvent, spent solvent comprising the halide salt and the solvent being produced upon contacting the alkali or alkaline earth-metal hydride with the halogenated silicon feed gas, the method comprising regenerating the solvent by separating the halide salt and the solvent by evaporating the solvent from the salt and condensing the solvent after evaporation.

22. A process for producing silane in a substantially closed-loop system with respect to halogens, the process comprising:
    contacting a halogenated silicon feed gas comprising at least one halosilane selected from the group consisting of silicon tetrahalide, trihalosilane, dihalosilane and monohalosilane with an alkali or alkaline earth metal hydride to produce silane and an alkali or alkaline earth-metal halide salt;
    electrolyzing the halide salt to produce metallic alkali or alkaline earth metal and halogen gas;
    producing a halogenated silicon feed gas comprising at least one halosilane selected from the group consisting of silicon tetrahalide, trihalosilane, dihalosilane and monohalosilane by contacting the halogen gas with at least one of:
    (1) silicon to produce silicon tetrahalide; and
    (2) hydrogen to produce hydrogen halide, wherein the hydrogen halide is further contacted with silicon to produce a mixture comprising silicon tetrahalide and trihalosilane; and
    contacting the halogenated silicon feed gas with an alkali or alkaline earth metal hydride to produce silane and an alkali or alkaline earth-metal halide salt, wherein (1) the metallic alkali or alkaline earth-metal is contacted with hydrogen in a solvent or (2) the alkali or alkaline earth-metal hydride is contacted with the halogenated silicon feed gas in a solvent.

23. The process as set forth in claim 22 wherein the metallic alkali or alkaline earth-metal is contacted with hydrogen in a solvent, the metallic alkali or alkaline earth-metal being added to a reaction vessel containing the solvent to form a reaction mixture, wherein hydrogen gas is bubbled through the reaction mixture.

24. The process as set forth in claim 22 wherein the alkali or alkaline earth-metal hydride is contacted with the halogenated silicon feed gas in a solvent, the solvent being produced upon contacting the alkali or alkaline earth-metal hydride with the halogenated silicon feed gas, the method comprising regenerating the solvent by separating the halide salt and the solvent by evaporating the solvent from the salt and condensing the solvent after evaporation.

\* \* \* \* \*